Dec. 27, 1932.  A. S. MARCHUS  1,892,435
COMBINED TIRE GAUGE AND FILLING VALVE
Original Filed March 15, 1928   2 Sheets-Sheet 1
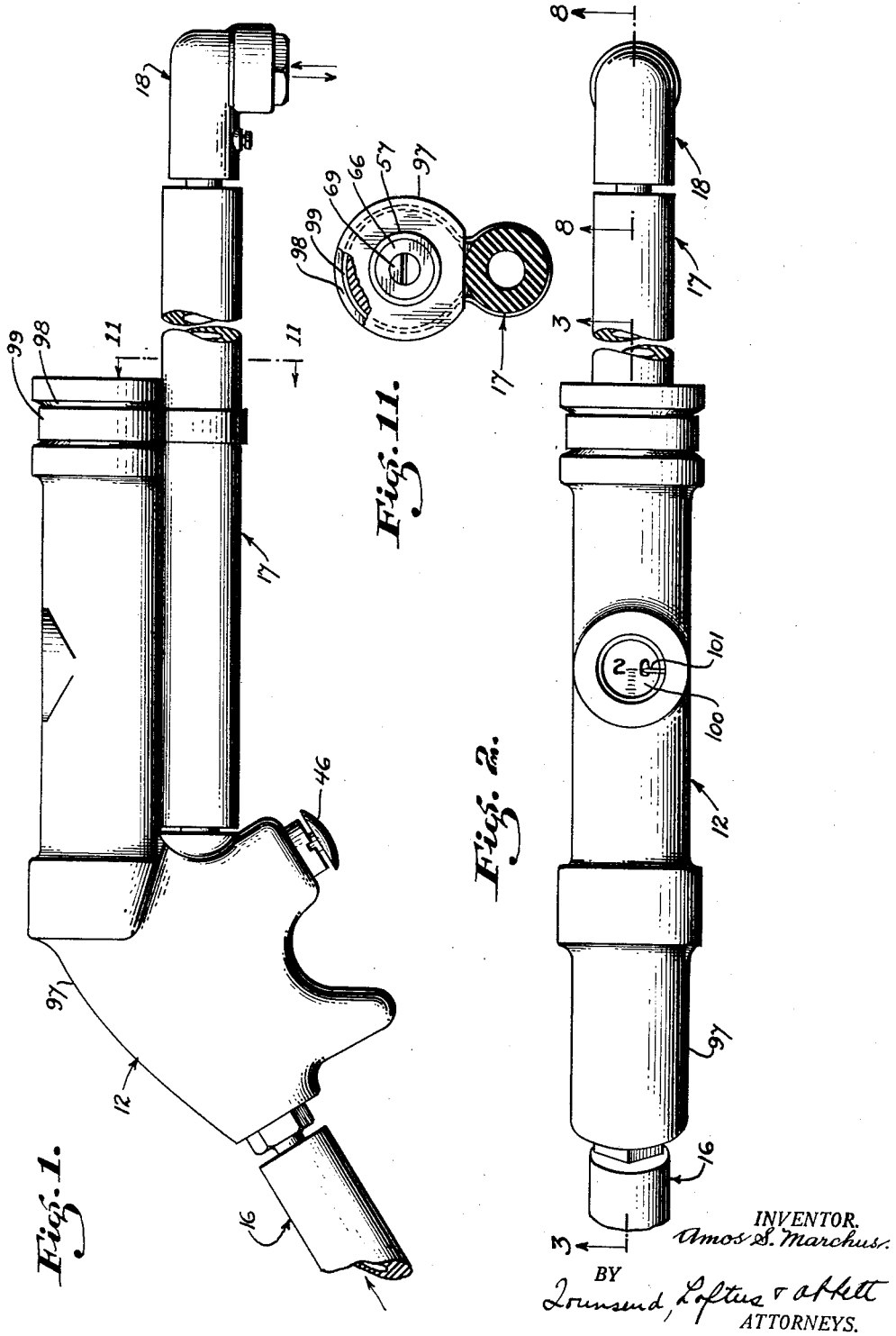
INVENTOR.
Amos S. Marchus.
BY
Townsend, Loftus & Abbett
ATTORNEYS.

Dec. 27, 1932. A. S. MARCHUS 1,892,435
COMBINED TIRE GAUGE AND FILLING VALVE
Original Filed March 15, 1928  2 Sheets-Sheet 2
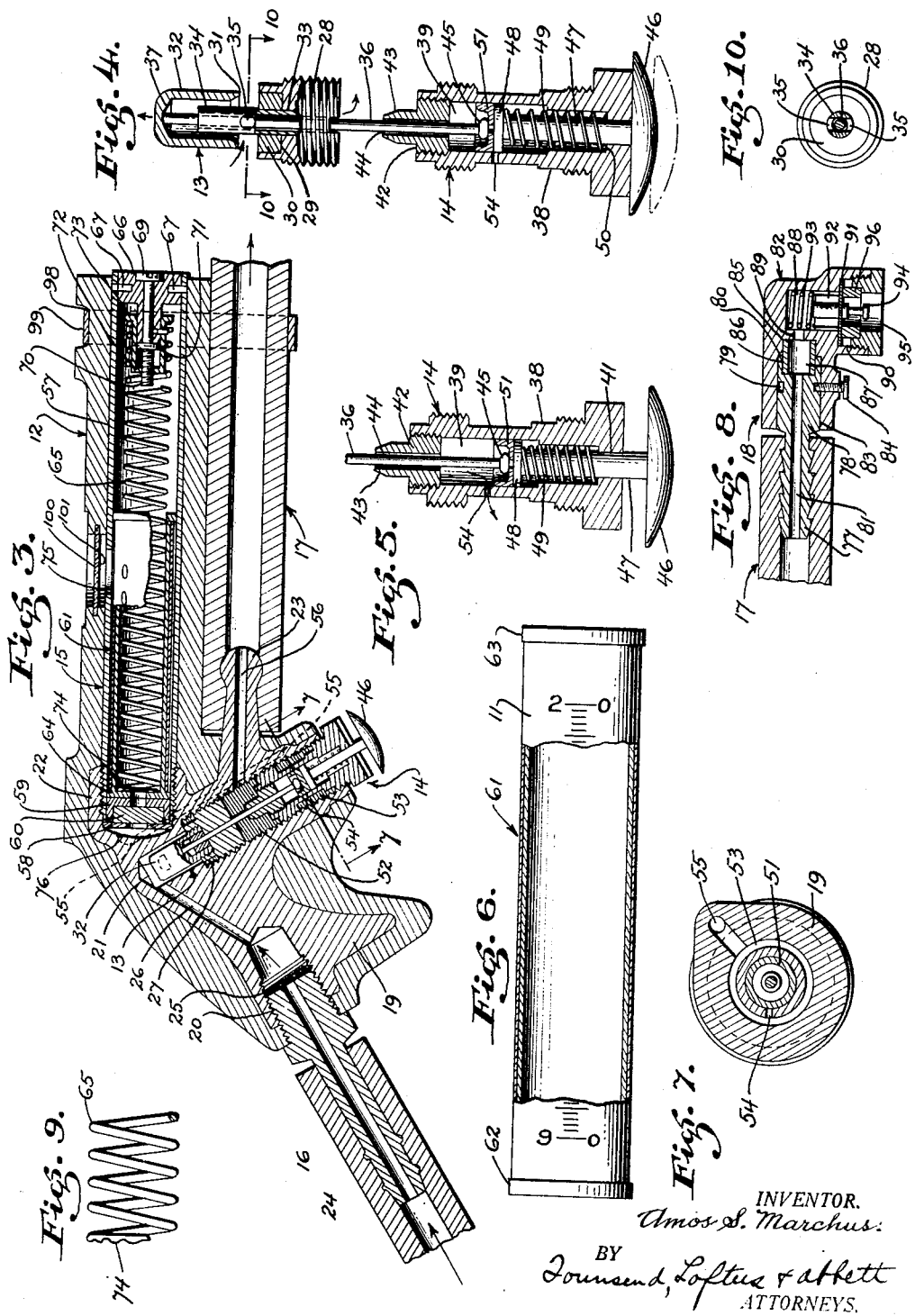
INVENTOR.
Amos S. Marchus
BY Townsend, Loftus & Abbett
ATTORNEYS.

Patented Dec. 27, 1932

1,892,435

UNITED STATES PATENT OFFICE

AMOS S. MARCHUS, OF OAKLAND, CALIFORNIA

COMBINED TIRE GAUGE AND FILLING VALVE

Original application filed March 15, 1928, Serial No. 261,790. Divided and this application filed June 3, 1929. Serial No. 367,866.

This application is a division of my copending application entitled "Combined tire gauge and filling valve", Ser. No. 261,790, filed March 15, 1928 now Patent No. 1,715,463, dated June 4, 1929.

The present invention relates to improvements in air valves generally, and in particular to an improved combined inflating valve and gauge adapted for use in garages, service stations and the like for inflating automobile tires and other inflatable objects.

The primary object of my invention is the provision of a combined tire gauge and filling valve which when in use and under pressure may first be applied to the air valve of a tire to ascertain the pressure therein, then by the manipulation of the trigger valve incorporated in my device the said air under pressure will be dispensed to the said tire, and upon the release of said trigger valve the pressure in the tire will automatically be registered in the gauge of my invention, then if the desired pressure in the tire has not been reached, my valve is manipulated again and upon release the new pressure may be read.

An important object of my invention is to provide a combined inflating valve and gauge which is compact, durable, comparatively simple in construction, positive in its action and accurate in recording and which is constructed in the form of a pistol to greatly facilitate its handling, operation and reading.

Another object of the invention is to provide a device of this character which is provided with a handy grip conforming to the butt of a pistol, with its valve-tripping mechanism so arranged as to be conveniently reached and tripped by the "trigger finger" of the operator.

Another object of the invention is the provision of a device of the class indicated which is completely enclosed in a soft rubber protective covering, which protects the working parts against disarrangement and breakage due to possible rough usage thereof, and also lends warmth to its handling in cold weather.

Still another object of the invention is the provision of a device which is provided with an air valve having a trigger means operable from one side of the device which greatly facilitates the actuation of the valve, and additionally aids in the rapid assemblage or disassemblage of the working parts thereof.

An additional object is to provide such a device with a novel gauge mechanism which is easy to operate by reason of its being initially set to register at a predetermined pressure, generally twenty pounds, thus considerably shortening the travel of the gauge-registering barrel.

Still another object of the invention is the provision of a rubber-encased device in which the glass gauge dial thereof is sealed in the rubber covering of the apparatus to protect it from breakage and to render the device completely water, air and rust proof as a whole.

A further object of the invention is the provision therein of a valve mechanism having a novel valve and valve-tripping mechanism.

Additional to the foregoing objects is the provision of a device which includes a novel swivel chuck adapted to be readily applied to the tire valve to be inflated.

Other and ancillary objects of my invention will be suggested in the following description and in the use of the device of my invention. Certain of the objects or certain portions or combinations of the objects of my invention may be attained with the use of less than all its advantageous features, or with modifications within its purview. It is petitioned therefore, that my invention be limited only by the claims constituting its final determination.

Referring to the drawings:

Fig. 1 is a side elevation illustrating the exterior contour of the rubber-encased device and showing the air inlet and outlet lines connected for use and the swivelled chuck mounted in the end of the outlet line.

Fig. 2 is a plan view showing the various parts shown in Fig. 1 and further illustrates the gauge dial and dial pointer by means of which the tire pressure is indicated.

Fig. 3 is a longitudinal mid-section illustrating the interior arrangement of the various parts constituting the device, the section being indicated by the line 3—3 in Fig. 2.

Fig. 4 is an enlarged sectional view of the valve mechanism per se removed from the device, the main inlet valve being shown in open position.

Fig. 5 is a sectional detail of the said valve mechanism and illustrating the gauge-actuating valve and valve-operating stem, this valve being also shown in open or operative position.

Fig. 6 is a view, partly in section, of the registering barrel which carries the pressure-recording indicia.

Fig. 7 is a transverse section taken through the body of the device at the line 7—7 as indicated in Fig. 3, and shows the position of the air port leading from the valve to the gauge barrel.

Fig. 8 is a sectional detail of the swivelled chuck.

Fig. 9 is a detail of the gauge spring showing its serrated inner end to prevent turning of the register cage.

Fig. 10 is a plan section showing the arrangement of the air inlet openings of the main valve, the section being indicated by the line 10—10 in Fig. 4.

Fig. 11 is a transverse sectional detail taken through the outlet line and looking toward the outer end of the device and showing the method of clamping the outlet line to the valve barrel, the section being indicated by the line 11—11 in Fig. 1.

Referring to the drawings in detail in which an embodiment of my invention is illustrated, the numeral 12 in a general way indicates the combined apparatus as a whole, and which comprises a main inlet valve mechanism 13, gauge valve mechanism 14, gauge mechanism 15, inlet line 16, outlet line 17 and swivel chuck 18.

The main portion of the device consists of a pistol-shaped casting 19 having an inlet bore 20 formed at one end, an angularly disposed valve bore 21, an interiorly-threaded gauge-barrel boss 22 and an outlet nipple 23. A hose nipple 24 is tapped into the threaded bore 20 of the device and provides means for the attachment of the pressure line 16, which in turn communicates with any suitable source of fluid pressure, not shown. A filtering screen 25 is positioned in the bore 20 and filters the incoming air before it reaches the valve bore 21; said bores 20 and 21 being in communication by means of a port 26 drilled through the casting as shown in Fig. 3.

The bore 21 communicates with an interiorly-threaded bore 27 of considerably larger diameter, which bore 27 extends downwardly and emerges at the underside of the casting. The main valve 13 consists of a plug 28, Fig. 4, having exteriorly arranged threads adapting it to be screw seated into the threaded bore 27, as shown in Fig. 3. This plug 28 is provided in its upper face with a recess 29 in which is seated a rubber ring 30 forming a valve seat upon which the lower bevelled edge 31 of the valve cap 32 is adapted to remain normally seated when my invention is in service.

The plug 28 is bored centrally as indicated at 33 and a small tube 34 is secured in this bore and extends upwardly through the ring 30 and terminates thereabove, the said tube being provided with transverse air inlet openings 35 positioned just above the upper face of the ring, as clearly shown in Fig. 4.

A valve stem 36 fits loosely in the plug bore and tube 34, and normally engages in the upper end 37 of the cap bore by means of spring urge as hereinafter described.

The gauge valve mechanism 14, Fig. 5, comprises an exteriorly-threaded shell 38 adapted also to be screw seated into the bore 27 but below the plug 28, and has an axially-disposed bore 39, a communicating bore 40 of smaller diameter, and a communicating stem-bore 41 of still smaller diameter than either of the above-mentioned bores. A plug 42 is screw seated into the upper end of the bore 39, and said plug is provided with a neck 43 and an axial bore 44 through which the stem 36 slidably operates, the lower end of said stem being provided with a head 45.

The main valve tripping mechanism consists of a trigger in the form of a rounded head 46 having an upwardly extending stem 47 slidably fitting in the bore 41, and having an annular head 48 formed at its upper end. A compression spring 49 surrounds the stem 47 and rests upon the shoulder 50 formed in the lower end of the bore 40 of the shell; said spring tending to normally urge the head 48 upwardly until brought to a stop by the head 46, as clearly shown in Fig. 4. A leather valve cup 51 is mounted in the bore 39 and rests upon the head 48 and forms a tight fit in said bore when pressure is introduced into the bore 39 by way of the plug bore 44.

When the gauge valve mechanism 14 is positioned in the bore 27, Fig. 3, it will be noted that a chamber 52 is formed therein above the plug 42, and a second chamber 53 is formed exteriorly of the shell 38 which is entirely independent of said chamber 52. The chamber 53 communicates with the bore 39 by means of a needle bore 54, Fig. 5, extending through the wall of the shell and said chamber 53 in turn communicates with a port 55 leading up through the casting and entering the inner end of the gauge barrel, as shown in Figs. 3 and 7. The chamber 52 communicates with the inlet tube 34, and the outlet air port 56 formed in the outlet nipple 23.

The gauge mechanism of my device comprises a barrel 57 screw-seated into the interiorly-threaded boss 22 and having its open inner end partially closed by a perforated disc 58, which forms a seat against which the gauge plunger normally abuts; said plunger consisting of a leather cup 59 and a rubber disc seat 60, which disc 60 seals the perforation in the disc 58 when seated thereagainst, as shown in Fig. 3.

A spring cage 61 having annular beaded ends 62 and 63 slidingly fits within the gauge barrel 57 and is substantially one-half the length of said gauge barrel. The cage is provided at its inner end with a head 64 against which the gauge spring 65 bears. The outer end of this gauge barrel is provided with a plug 66 pinned to the barrel by means of diametrically disposed pins 67, said plug having an inwardly extending stem provided with a centrally-disposed bore for the reception of a swivel pin 69 which pin is provided at its outer end with a screw head and at its inner end with a threaded portion 70 and an intermediate shoulder 71 preventing its longitudinal movement in the bore. A thimble 72 is mounted upon the stem and the threaded end 70 of the pin extends through the threaded inner end of said thimble adapting it for longitudinal adjustment relative to the plug 66, said thimble bearing at its out end an annular rim 73 forming a seat for the outer end of the spring 65, and adapting said spring for adjustment by compressing or expanding the same as desired in the calibration of the gauge of the device.

The cage 61 is provided between the beads 62 and 63 thereof with a graduated strip of paper 11 or other suitable material bearing the pound graduations for pressure ranging from 20 to 90 as shown in Fig. 6. These graduations are kept uppermost at all times by the serrated inner end 74 of the spring 65 which prevents the cage's turning in the barrel 57. The upper side of the barrel 57 is provided with a sight opening 75 through which the graduations on the cage may be viewed in reading the indicated pressure.

A chamber 76 is formed in front of the barrel disc 60 and which communicates with the port 55 and the interior of the gauge barrel through the perforation in said disc whereby fluid pressure may be admitted to the gauge plunger for causing its outward movement together with the spring cage against which the plunger abuts, this movement taking place only upon the release of fluid pressure from the tire into the chamber 53 as hereinafter described.

The chuck 18 is swivelly mounted in the end of the outlet line as shown in Fig. 8, said outlet line 17 being not longer than a foot or so for the convenient handling of the chuck by the free hand of the operator. This chuck comprises a nipple 77 having a finished portion 78 provided with an annular groove 79 and a recessed inner end 80 communicating with the bore 81 through said parts. The angle fitting 82 is provided with a bore 83 adapted to receive the portion 78 and to rotate freely thereon and is held in connected relation thereto by means of a screw 84, which screw has its inner end projecting into the groove 79. A counter bore 85 is formed in the angle fitting 82 and said bore is of the same diameter as the recess in the end portion 80, both being adapted to receive a short piece of rubber tubing 86 which forms the union at the joint between the angle fitting 82 and the nipple 77. This tube prevents leakage of air at these parts by reason of its cylindrical expansion when fluid pressure is admitted to the swivel 18, the action being assisted by means of a small coil spring 87 which is fitted into the tube and which also prevents the tube from collapsing.

The valve end of the chuck is provided with a bore 88 positioned at right angles to the bore 81 and communicates therewith by means of a port 89. A counterbore 90 of larger diameter than the bore 88 provides a seat for a disc 91, which disc is centrally perforated and provides a guide and seat for a grooved valve member 92 normally held seated by a spring 93 mounted above the member 92 in the bore 88. This valve 92 is provided with a downwardly projecting stem 94 which is adapted to contact and bear against the stem of the tire valve (not shown) of the tire to be inflated to open the said tire valve, and which action simultaneously unseats the valve 92 and permits the flow of air from the tube 17 to the inner tube of the tire as long as it is held in place by the operator with the trigger 46 functioning. A bushing 95 secures a rubber gasket ring 96 in place against the disc 91 and provides an air tight seat when pressed against the edge of the tire valve stem.

The entire device when assembled is provided with a fairly thick covering of soft rubber 97 which is vulcanized or molded thereon in any suitable manner, the barrel end of the covering being grooved as indicated at 98 to receive a flat metal ring 99 which is fitted in the groove and also adapted to encompass the tube 17, which ring is then crimped in place as shown in Fig. 11 to tightly bind the tube 17 and barrel of the device together. The gauge glass 100 and indicator pointer 101 are set into the rubber as shown in Figs. 2 and 3.

The operation of my invention is as follows:

Assuming that the line 16 is under say from sixty-five to ninety pounds air pressure, from any suitable source, air will enter the valve bore region 21 and hold the cap 32 tightly seated upon its seat 30 and force the stem 36 downwardly and set the trigger or head 46 in "cocked" position as shown in Figs. 3 and 5. When ready to deliver air, the operator grasps the butt of the device as he would a pistol with the forefinger of the hand resting on the trigger 46, and with the other hand he holds the swivel chuck in place upon the tire valve to be inflated in the usual way, and which action opens the tire valve. Slight pressure is now brought to bear against the trigger which forces it to the position shown in Fig. 4, thereby unseating the cap 32 by an upward thrust of the stem 36. Air pressure is now free to escape from the line 16 by way of the openings 35, the chamber 52, and thence through the port 56 to the outlet line 17 and chuck 18.

Upon releasing the trigger 46, the pressure in the bore 21 automatically seats the valve cap 32 again and returns the parts to their initial positions, as shown in Fig. 3. At this point of the air filling the pressure in the inflated tire may be ascertained, the tire valve being open, the confined fluid pressure in the tire backs up through the line 17 and into the chamber 52, from whence it travels through the bore 44 of the plug 42 and into the bore 39. This incoming air causes the valve 51 to be depressed to the position shown in Fig. 5, thereby opening the needle port 54 to the chamber 53 and thence through the port 55 to the chamber 76 and finally to the plunger of the gauge, thereby forcing the graduated spring cage outwardly until equalization is reached, whereby the indicated pressure may be read. When the reading has been taken the chuck may be released if the pressure is sufficient, or if insufficient the trigger is again tripped to unseat the valve 32 and allow an additional flow of air to the tire.

The spring 49 tends to keep the head 48 of the valve, the cup 51 and the head of the stem 36 in contact at all times, and said spring also assists in a measure in unseating the valve cap 32 when pressure is applied to the trigger 46 by the operator. It also serves to assist the closing of the needle port 54 by the cup valve 51, as shown in Fig. 4, during the period of time that the valve cap 32 is unseated in the inflation of the tire.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. A device for the purpose indicated comprising a body formed for hand-grasp having a chamber extending from the entrance at one side of the body toward the opposite side, and stopping short of said opposite side; ducts in the body communicating with said chamber, the first arranged for inlet connection with a source of fluid pressure, a second leading for discharge connection with a place of use, and a third leading for discharge connection with the pressure gauge, and a valve apparatus comprising a valve-seating and housing element having ports and valve seating areas with valve means and valve operating connections for controlling the fluid pressure inflow from the source and its delivery to the place of use and to the pressure gauge, said element with the remainder of said valve apparatus mentioned being arranged for introduction into said chamber through said entrance and for fluid-tight fitting in the chamber at operative positions therein, of the several parts of said valve apparatus, and having at the outer extremity means for sealing fluid-tight the entrance to said chamber, and having arranged for protrusion fluid-tight therethrough for exterior manipulation, a thrust member for operating the valves.

2. The construction defined in claim 1, the valve means comprising two valves, the first controlling the fluid pressure inlet arranged to be seated by fluid pressure from the source, and a second arranged to intercept the fluid pressure between the pressure fluid inlet port and the port of communication with the gauge; a second thrust member arranged for thrusting the pressure inlet valve open and extending for cooperating with said first mentioned thrust member for communicating the thrust of the latter for opening said inlet valve against the fluid pressure from the source, said second valve being interposed between the two thrust members, and a spring reacting on the first thrust member for holding it normally thrust against said intercepting valve for holding the latter constantly pressed against the second thrust member in a manner tending to but insufficient to open the inlet valve.

3. The construction defined in claim 1, the valve means comprising two valves, the first controlling the fluid pressure inlet port and arranged to be seated by fluid pressure from the source, and a second arranged to intercept the fluid pressure between the port of communication with the place of use and the port of communication with the gauge when the first valve is open, and a spring reacting on the second valve and through it on the first valve in opposition to the fluid pressure from the source that causes the first valve to be held seated except at such times when the first valve is lifted from its seat and the second valve is moved to its said intercepting position by the exterior manipulation of the thrust member.

AMOS S. MARCHUS.